(12) United States Patent
Roussos et al.

(10) Patent No.: US 7,991,905 B1
(45) Date of Patent: Aug. 2, 2011

(54) ADAPTIVELY SELECTING TIMEOUTS FOR STREAMING MEDIA

(75) Inventors: Konstantinos Roussos, Sunnyvale, CA (US); Yasuhiro Endo, San Jose, CA (US); Sandeep Yadav, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 969 days.

(21) Appl. No.: 10/365,074

(22) Filed: Feb. 12, 2003

(51) Int. Cl.
*G06F 15/16* (2006.01)
(52) U.S. Cl. ...................................................... 709/231
(58) Field of Classification Search ................... 709/231
See application file for complete search history.

(56) References Cited

U.S. PATENT DOCUMENTS

| | | | |
|---|---|---|---|
| 5,043,885 A | 8/1991 | Robinson | |
| 5,402,416 A | 3/1995 | Cieslak et al. | |
| 5,583,561 A | 12/1996 | Baker et al. | |
| 5,586,264 A | 12/1996 | Belknap et al. | |
| 5,596,420 A | 1/1997 | Daum | |
| 5,615,362 A | 3/1997 | Jensen et al. | |
| 5,737,747 A | 4/1998 | Vishlitzky et al. | |
| 5,799,185 A | 8/1998 | Watanabe | |
| 5,819,292 A | 10/1998 | Hitz et al. | |
| 5,854,887 A | 12/1998 | Kindell et al. | |
| 5,918,020 A | 6/1999 | Blackard et al. | |
| 5,953,506 A | 9/1999 | Kalra et al. | |
| 5,960,452 A | 9/1999 | Chi | |
| 5,963,962 A | 10/1999 | Hitz et al. | |
| 6,038,230 A | 3/2000 | Ofek | |
| 6,038,570 A | 3/2000 | Hitz et al. | |
| 6,064,676 A | 5/2000 | Slattery et al. | |
| 6,085,193 A | 7/2000 | Malkin et al. | |
| 6,111,896 A | 8/2000 | Slattery et al. | |
| 6,275,496 B1 | 8/2001 | Burns et al. | |
| 6,324,182 B1 | 11/2001 | Burns et al. | |
| 6,343,083 B1 * | 1/2002 | Mendelson et al. | 370/466 |
| 6,351,471 B1 | 2/2002 | Robinett et al. | |
| 6,351,474 B1 | 2/2002 | Robinett et al. | |
| 6,366,970 B1 | 4/2002 | Wolff et al. | |
| 6,370,688 B1 | 4/2002 | Hejna, Jr. | |
| 6,377,972 B1 | 4/2002 | Guo et al. | |
| 6,407,680 B1 | 6/2002 | Lai et al. | |
| 6,424,993 B1 | 7/2002 | Weber | |
| 6,442,141 B1 | 8/2002 | Borella et al. | |
| 6,463,508 B1 | 10/2002 | Wolf et al. | |
| 6,484,212 B1 | 11/2002 | Markowitz et al. | |
| 6,505,169 B1 | 1/2003 | Bhagavath et al. | |
| 6,516,361 B2 | 2/2003 | Lym et al. | |

(Continued)

OTHER PUBLICATIONS

H. Schulzrinne et al. Real Time Streaming Protocol (RTSP) Network Working Group RFC 2326.

(Continued)

*Primary Examiner* — John Follansbee
*Assistant Examiner* — Alan S Chou
(74) *Attorney, Agent, or Firm* — Perkins Coie LLP (57) ABSTRACT

The present invention provides a streaming media cache configured to select a timing interval, chosen from a set of one or more predetermined timing intervals, for each client that requests a data stream from the streaming media cache. Illustratively, clients requesting data streams below a predetermined bit rate ("bandwidth") are assigned longer timing intervals than clients requesting data streams above the predetermined bit rate. More specifically, because the server can accommodate a larger number of relatively low-bandwidth clients than relatively high-bandwidth clients, the server selects timing intervals of longer duration for the relatively low-bandwidth clients so it may have more time to schedule send times for their requested packets.

26 Claims, 7 Drawing Sheets

U.S. PATENT DOCUMENTS

| | | | |
|---|---|---|---|
| 6,522,649 | B1 | 2/2003 | Stallkamp |
| 6,593,860 | B2 | 7/2003 | Lai et al. |
| 6,594,699 | B1 | 7/2003 | Sahai et al. |
| 6,594,751 | B1 | 7/2003 | Leivent |
| 6,651,103 | B1 | 11/2003 | Markowitz et al. |
| 6,665,755 | B2 | 12/2003 | Modelski et al. |
| 6,680,976 | B1 | 1/2004 | Chen et al. |
| 6,708,213 | B1 | 3/2004 | Bommaiah et al. |
| 6,721,850 | B2 | 4/2004 | Hofmann et al. |
| 6,742,082 | B1 | 5/2004 | Lango et al. |
| 6,744,763 | B1 | 6/2004 | Jones et al. |
| 6,747,991 | B1 | 6/2004 | Hemy et al. |
| 6,760,765 | B1 | 7/2004 | Asai et al. |
| 6,829,648 | B1 | 12/2004 | Jones et al. |
| 6,917,984 | B1 * | 7/2005 | Tan ............... 709/238 |
| 6,990,512 | B1 * | 1/2006 | Major et al. ............ 709/203 |
| 7,099,953 | B2 * | 8/2006 | Horiuchi et al. .......... 709/231 |
| 7,191,242 | B1 | 3/2007 | Serenyi et al. |
| 7,333,431 | B2 | 2/2008 | Wen et al. |
| 7,346,698 | B2 | 3/2008 | Hannaway |
| 7,356,575 | B1 | 4/2008 | Shapiro |
| 7,444,419 | B2 | 10/2008 | Green |
| 7,478,164 | B1 | 1/2009 | Lango et al. |
| 7,496,678 | B2 | 2/2009 | Yadav et al. |
| 2001/0003193 | A1 | 6/2001 | Woodring et al. |
| 2001/0034786 | A1 | 10/2001 | Baumeister et al. |
| 2001/0052132 | A1 | 12/2001 | Fryer |
| 2002/0029282 | A1 | 3/2002 | Buddhikot et al. |
| 2002/0042837 | A1 * | 4/2002 | Ebata et al. ................ 709/232 |
| 2002/0047899 | A1 | 4/2002 | Son et al. |
| 2002/0056126 | A1 | 5/2002 | Srikantan et al. |
| 2002/0071654 | A1 * | 6/2002 | Notoya et al. ............... 386/65 |
| 2002/0097750 | A1 * | 7/2002 | Gunaseelan et al. ........ 370/503 |
| 2002/0116473 | A1 | 8/2002 | Gemmell |
| 2002/0116585 | A1 | 8/2002 | Scherr |
| 2002/0162047 | A1 | 10/2002 | Peters et al. |
| 2002/0169926 | A1 | 11/2002 | Pinckney et al. |
| 2002/0181506 | A1 | 12/2002 | Loguinov |
| 2003/0005452 | A1 | 1/2003 | Rodriguez |
| 2003/0055910 | A1 * | 3/2003 | Amini et al. ............. 709/214 |
| 2003/0067877 | A1 * | 4/2003 | Sivakumar et al. ......... 370/232 |
| 2003/0189936 | A1 * | 10/2003 | Terrell et al. ........... 370/395.31 |
| 2003/0217113 | A1 | 11/2003 | Katz et al. |
| 2003/0236904 | A1 * | 12/2003 | Walpole et al. ............ 709/231 |
| 2004/0039837 | A1 | 2/2004 | Gupta et al. |
| 2004/0162787 | A1 * | 8/2004 | Madison et al. ............. 705/64 |
| 2004/0163123 | A1 | 8/2004 | Okada et al. |
| 2004/0202148 | A1 * | 10/2004 | Kuehnel .................. 370/352 |
| 2005/0117580 | A1 * | 6/2005 | del Val et al. ............ 370/395.2 |
| 2005/0165915 | A1 * | 7/2005 | Hejna, Jr. ................ 709/219 |
| 2005/0223107 | A1 | 10/2005 | Mine et al. |
| 2006/0047774 | A1 | 3/2006 | Bowman et al. |
| 2006/0064500 | A1 * | 3/2006 | Roth et al. ................ 709/231 |
| 2006/0106961 | A1 * | 5/2006 | Ebata et al. ................ 710/52 |
| 2006/0184667 | A1 * | 8/2006 | Clubb et al. ............... 709/224 |
| 2006/0218611 | A1 | 9/2006 | Son et al. |
| 2007/0094407 | A1 | 4/2007 | Serenyi et al. |
| 2007/0143468 | A1 | 6/2007 | Serenyi et al. |
| 2008/0095339 | A1 | 4/2008 | Elliott et al. |

OTHER PUBLICATIONS

NetCache TM 5.1 Accelerator First-Time Configuration Guide.
NetCache TM 5.1 Configuration Guide . . . .
NetCache TM 5.1 Deployment Planning Guide.
NetCache TM 5.1 Features and Configuration Planning Guide.
NetCache TM 5.1 Routine Administration Guide.
NetCache TM 5.1 Streaming Media Cache First-Time Configuration Guide.
NetCache TM 5.1 Web Cache First-Time Configuration Guide.
H. Schulzrinne, et al., "Real Time Streaming Protocol" (RTSP) Network Working Group. Copyright: The Internet Society 1998, pp. 1-86.
Co-pending U.S. Appl. No. 10/974,427, filed Oct. 26, 2004.
Co-pending U.S. Appl. No. 09/981,644, filed Oct. 16, 2001.
Co-pending U.S. Appl. No. 09/981,328, filed Oct. 16, 2001.
Co-pending U.S. Appl. No. 11/228,689, filed Sep. 16, 2005.
Notice of Allowance Mailed Apr. 19, 2010 in Co-pending U.S. Appl. No. 10/974,427, filed Oct. 26, 2004.
Notice of Allowance Mailed Feb. 26, 2010 in Co-pending U.S. Appl. No. 10/974,427, filed Oct. 26, 2004.
Notice of Allowance Mailed Nov. 2, 2009 in Co-pending U.S. Appl. No. 10/974,427, filed Oct. 26, 2004.
Notice of Allowance Mailed Nov. 10, 2008 in Co-pending U.S. Appl. No. 09/981,644, filed Oct. 16, 2001.
Notice of Allowance Mailed Oct. 6, 2008 in Co-pending U.S. Appl. No. 09/981,644, filed Oct. 16, 2001.
Notice of Allowance Mailed Dec. 12, 2008 in Co-pending U.S. Appl. No. 11/228,689, filed Sep. 16, 2005.
Advisory Action Mailed Apr. 1, 2009 in Co-pending U.S. Appl. No. 09/981,328, filed Oct. 16, 2001.
Advisory Action Mailed Jul. 12, 2007 in Co-pending U.S. Appl. No. 09/981,644, filed Oct. 16, 2001.
Final Office Action Mailed Dec. 9, 2008 in Co-pending U.S. Appl. No. 10/974,427, filed Oct. 26, 2004.
Final Office Action Mailed May 9, 2007 in Co-pending U.S. Appl. No. 09/981,644, filed Oct. 16, 2001.
Final Office Action Mailed Jul. 7, 2005 in Co-pending U.S. Appl. No. 09/981,644, filed Oct. 16, 2001.
Final Office Action Mailed Jan. 5, 2009 in Co-pending U.S. Appl. No. 09/981,328, filed Oct. 16, 2001.
Final Office Action Mailed Nov. 17, 2006 in Co-pending U.S. Appl. No. 09/981,328, filed Oct. 16, 2001.
Final Office Action Mailed Dec. 28, 2005 in Co-pending U.S. Appl. No. 09/981,328, filed Oct. 16, 2001.
Non-Final Office Action Mailed Apr. 28, 2009 in Co-pending U.S. Appl. No. 10/974,427, filed Oct. 26, 2004.
Non-Final Office Action Mailed Jun. 4, 2008 in Co-pending U.S. Appl. No. 10/974,427, filed Oct. 26, 2004.
Non-Final Office Action Mailed Feb. 6, 2008 in Co-pending U.S. Appl. No. 09/981,644, filed Oct. 16, 2001.
Non-Final Office Action Mailed Aug. 23, 2007 in Co-pending U.S. Appl. No. 09/981,644, filed Oct. 16, 2001.
Non-Final Office Action Mailed Nov. 15, 2006 in Co-pending U.S. Appl. No. 09/981,644, filed Oct. 16, 2001.
Non-Final Office Action Mailed Jan. 10, 2006 in Co-pending U.S. Appl. No. 09/981,644, filed Oct. 16, 2001.
Non-Final Office Action Mailed Jan. 6, 2005 in Co-pending U.S. Appl. No. 09/981,644, filed Oct. 16, 2001.
Non-Final Office Action Mailed Jan. 11, 2010 in Co-pending U.S. Appl. No. 09/981,328, filed Oct. 16, 2001.
Non-Final Office Action Mailed Jul. 9, 2009 in Co-pending U.S. Appl. No. 09/981,328, filed Oct. 16, 2001.
Non-Final Office Action Mailed Jan. 28, 2008 in Co-pending U.S. Appl. No. 09/981,328, filed Oct. 16, 2001.
Non-Final Office Action Mailed Aug. 9, 2007 in Co-pending U.S. Appl. No. 09/981,328, filed Oct. 16, 2001.
Non-Final Office Action Mailed Mar. 8, 2007 in Co-pending U.S. Appl. No. 09/981,328, filed Oct. 16, 2001.
Non-Final Office Action Mailed May 22, 2006 in Co-pending U.S. Appl. No. 09/981,328, filed Oct. 16, 2001.
Non-Final Office Action Mailed Jun. 17, 2005 in Co-pending U.S. Appl. No. 09/981,328, filed Oct. 16, 2001.
Non-Final Office Action Mailed Jan. 13, 2005 in Co-pending U.S. Appl. No. 09/981,328, filed Oct. 16, 2001.
Non-Final Office Action Mailed Jun. 26, 2008 in Co-pending U.S. Appl. No. 11/228,689, filed Sep. 16, 2005.
Non-Final Office Action Mailed Jul. 9, 2010 in Co-pending U.S. Appl. No. 09/981,328, filed Oct. 16, 2001.
Notice of Allowance Mailed Jan. 12, 2011 in Co-Pending U.S. Appl. No. 09/981,328, filed Oct. 16, 2001.

* cited by examiner

ADAPTIVELY SELECTING TIMEOUTS FOR STREAMING MEDIA

FIELD OF THE INVENTION

The present invention relates to streaming media and, more specifically, to a technique for scheduling when a media stream is transmitted from a source node to different client nodes in a network.

BACKGROUND OF THE INVENTION

In conventional television or radio broadcasting, one or more transmitters broadcast electromagnetic signals encoded with audio and/or video information. The signals are transmitted over predetermined frequency bands, e.g., determined in the United States by the Federal Communications Commission (FCC). A receiver tuned to receive signals broadcast in a particular frequency band converts the received signals into audio and/or video signals which are output to a user. In such a broadcasting model, the number of receivers that may simultaneously receive a broadcast signal is proportional to the signal's power. That is, as the broadcast signal's power is increased, a larger number of receivers can receive the signal.

Similarly, the same principles are also believed to be true with cable TV broadcasts. A cable TV provider transmits a cable signal through physical cables installed within its broadcasting "territory." The number of viewers capable of receiving the transmitted signal is defined by the signal's power and the geographical distribution of the installed cables. More specifically, more viewers can receive the cable TV signal as the power of the signal is increased. Accordingly, one or more cable "repeaters" are often installed within a provider's territory to increase the power of the provider's cable TV signal.

In contrast to the broadcasting models above, the situation is different with multimedia broadcast over a computer network, such as the Internet. Specifically, the number of users that may simultaneously receive a media data stream broadcast over the network cannot be increased by increasing the power of the transmitted data stream. Instead, the number of users that receive the data stream is typically limited by the available bandwidth of the broadcasting server. In this context, the media data stream is a digitized form of video, audio, or other multimedia that may be broadcast over the network and presented to a user.

For example, suppose a broadcasting server can transmit a "live" Internet data stream at a maximum output bit rate ("bandwidth") of 1 Gigabit per second (Gbps). As used herein, the live stream is received by the server in real-time from an outside media source, and the stream is re-transmitted by the server before being stored in some form of mass storage medium. If the live stream is simultaneously broadcast from the server to a plurality of users capable of receiving data at a maximum bit rate equal to 1 Megabit per second (Mbps), then the server is limited to broadcasting the stream to 1000 users or less (1 Gbps available/1 Mbps per user=1000 users). Thus, unlike other traditional forms of broadcasting, the server cannot transmit the live stream to more than 1000 users simply by transmitting the stream at a higher power.

In general, the broadcasting server communicates with one or more clients in the network according to a client/server model of information delivery. In this model, the client may comprise an application, such as a conventional web browser, executing on a computer that "connects" to the server over a computer network, such as a point-to-point link, shared local area network (LAN), wide area network (WAN), or virtual private network (VPN) implemented over a public network such as the Internet. Each client may request a data stream from the server by issuing messages, usually in the form of packets, to the server.

The server is a computer that provides a requested media data stream to one or more clients. The media data stream may be stored in a data storage medium, such as a magnetic disk, attached to the server. In this case, the server may be a file server ("filer") configured to provide file service relating to the information stored in its attached storage devices. Alternatively, rather than storing the data stream in a form of mass storage medium attached to the server, the data stream may reside in the server's memory or buffer cache. Thus, the server may be configured as a "network cache" that provides clients access to media data streams stored in its "in-core" memory, i.e., random-access memory (RAM). For instance, the server may be configured to implement Netcache™, by Network Appliance, Inc. of Sunnyvale, Calif., a proprietary application that manages file access requests for information stored in a computer's in-core memory.

Client requests for a server's media data stream are typically formatted in accordance with a streaming data protocol, such as the Real Time Streaming Protocol (RTSP) or the Microsoft Media Server (MMS) protocol. These protocols enable clients to request that the server PLAY, PAUSE, RECORD, etc. a particular media data stream. For example, client messages formatted in accordance with the RTSP protocol are described in more detail in RFC 2326, entitled "*Real Time Streaming Protocol (RTSP)*," which is hereby incorporated by reference as though fully set forth herein.

As noted, the number of clients that may receive a server's media data stream is limited by the bandwidths of the server and clients. In addition, the bandwidths of other intermediate network devices, such as routers, switches, and the like, can further limit the number of clients with which the server can communicate. As is known, packets transmitted from a broadcasting server may be forwarded to one or more intermediate network devices before they reach their destination, e.g., a client. The intermediate devices are generally used to ensure that the packets are routed to their destinations in an efficient manner. More specifically, the devices are often configured to adjust routing information stored in network headers, e.g., Transmission Control Protocol/Internet Protocol (TCP/IP) headers, pre-pended to the packets. In this manner, the intermediate devices route the packets through the network along routes having relatively less network "traffic" than other alternate routes.

Intermediate network devices typically have internal buffer memories that store in-coming packets. An intermediate device's buffer is used to temporarily store received data packets when the device receives in-coming packets at a rate greater than the rate at which the device outputs data packets. For example, in-coming packets may be received by an intermediate device at 100 kilobits per second (kbps), although the device outputs processed packets at a rate of only 90 kbps. In this situation, the device's buffer memory stores increasing amounts of received data until the rate it receives in-coming packets becomes less than the rate at which it outputs packets.

The number of clients connected to a broadcasting server therefore may be limited by the size of the buffer memories in one or more intermediate network devices. That is, when the server broadcasts media data stream packets to a large number of clients, packets transmitted from the server may be dropped by an intermediate device when the device's buffer memory is full. As a result, the data streams received at the server's destination clients may be degraded in quality and/or smoothness.

It is therefore generally desirable to avoid surges of media stream data packets broadcast from a server, thereby preventing the "overloading" of resources, e.g., buffer memories and bandwidths, in intermediate devices through which the packets are forwarded. Further, it is desirable for the server to transmit client-requested data packets without excessive consumption of its own resources, such as its central processing unit (CPU) bandwidth.

SUMMARY OF THE INVENTION

The present invention provides a technique for optimizing resource allocation in a is server that transmits data packets to a plurality of clients. In operation, the server generates a "send time" for each data packet it transmits to the clients. A packet's send time defines when the server transmits the data packet to a requesting client. However, generation of a large number of send times may consume excessive resources, such as CPU bandwidth, in the server. According to the inventive technique, the server optimizes usage of its resources when generating send times by selecting a timing interval, chosen from a set of one or more predetermined timing intervals, for each client that requests data packets from the server. In this context, a client's timing interval is a time interval that defines the periodicity at which data packets are transmitted from the server to the client. Because the server can accommodate a larger number of relatively low-bandwidth clients than relatively high-bandwidth clients, the server selects timing intervals of longer duration for the relatively low-bandwidth clients so it may have more time to generate send times for their requested packets.

Illustratively, the server "rounds" send times of client-requested data packets to align with their clients' timing intervals. For instance, suppose a client's timing interval is equal to, e.g., a 10 ms interval. In such a scenario, a packet scheduled to be transmitted to the client in 48 ms is actually sent after 50 ms or 40 ms, depending on how the server is configured to align the scheduled send time with the 10 ms intervals. Preferably, the server implements one or more timers to measure every time the client's timing interval elapses. According to the illustrative embodiment, the server assigns longer duration timing intervals to clients requesting data packets below a predetermined bit rate ("bandwidth") than to clients requesting data packets above the predetermined bit rate. For example, the server may choose a 10 ms timing interval for clients requesting data packets at bit rates less than 300 kbps, whereas the server chooses a 1 ms timing interval for clients requesting data packets at bit rates above 300 kbps.

Advantageously, by selecting appropriate timing intervals based on clients' associated bit rates, the server uses its CPU bandwidth more efficiently when scheduling send times for client-requested data packets. Consequently, the server is less likely to "lose" data packets due to scheduling inefficiencies, and the server's performance is thus improved over previous implementations.

BRIEF DESCRIPTION OF THE DRAWINGS

The above and further advantages of the invention may be better understood by referring to the following description in conjunction with the accompanying drawings in which like reference numerals indicate identically or functionally similar elements.

DETAILED DESCRIPTION OF ILLUSTRATIVE EMBODIMENTS

A. Networking Environment

Figure 1:
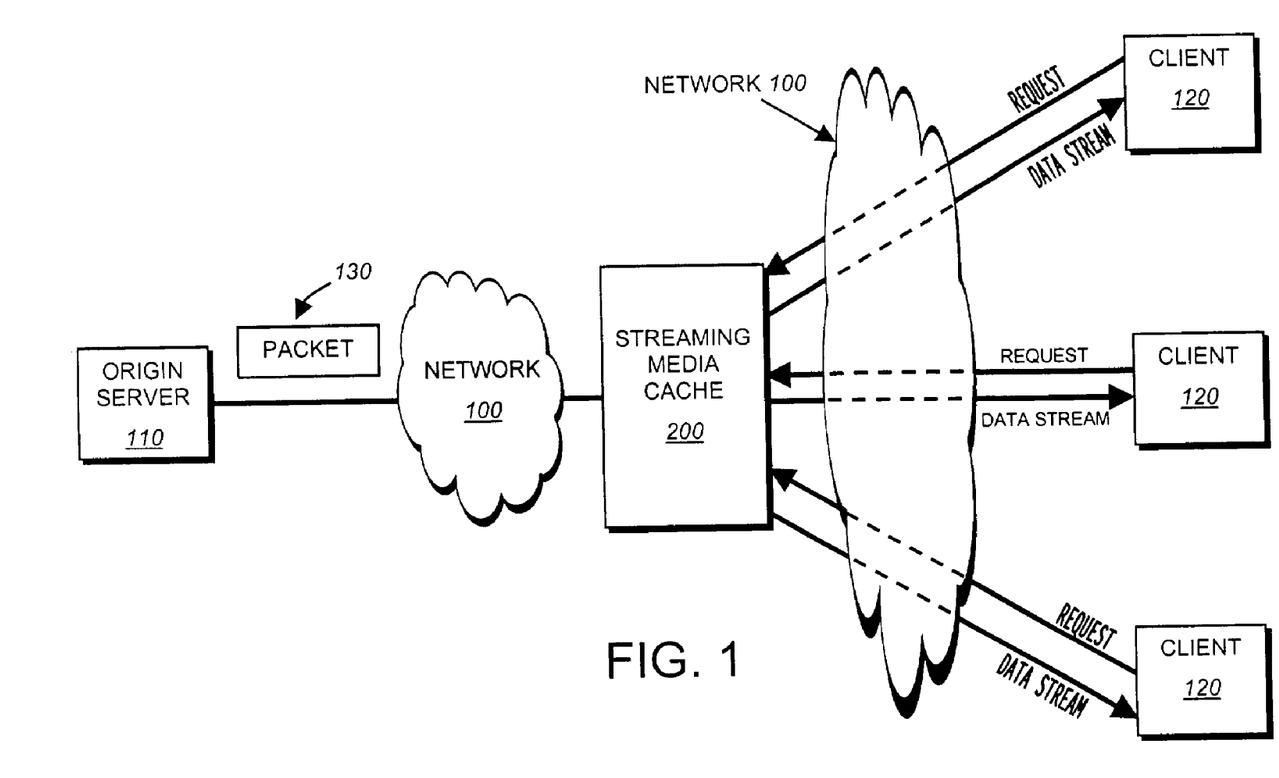
FIG. 1 is a schematic block diagram of an exemplary network where an illustrative streaming media cache receives a multimedia stream from a server and broadcasts the stream to one or more clients.

FIG. 1 illustrates a streaming media cache (server) 200 coupled to an origin server 110 and a plurality of clients 120 over a network 100. The streaming media cache typically communicates with the origin server and the clients by exchanging discrete data packets 130 over the network. As used herein, a data packet is broadly understood to be a unit of data transmitted over the network. As such, a data packet according to the invention may comprise one or more conventional data packets. Typically, the packets are formatted in accordance with predetermined communication protocols, such as the Transmission Control Protocol (TCP), User Datagram Protocol (UDP) and the Internet Protocol (IP). In this context, a protocol consists of a set of rules defining how packets are communicated. Each data packet generally comprises "payload" data appended to one or more network headers that define the packet's routing through the network.

The network 100 contains a plurality of interconnected "nodes," i.e., computers, including the streaming media cache 200, the origin server 110, and the plurality of clients 120. The network may be organized to include wide area networks (WAN), shared local area networks (LAN), point-to-point links, virtual private networks (VPN) implemented over a public network such as the Internet, and so forth. Intermediate network devices (not shown), such as conventional routers and switches, in the network 100 typically provide network services that facilitate the transmission of data packets between nodes. For example, a Web Cache Coordination Protocol (WCCP) router in the network may be configured to forward data packets communicated between the clients 120 and the streaming media cache 200.

In operation, a client 120 sends a request for a data stream, or a portion of a data stream, over the network 100 to the streaming media cache 200. The requested data stream may comprise digitized representations of audio data, video data, static images, executable files, and the like, or any combination thereof. The client's request may take the form of a Uniform Resource Locator (URL), a Hypertext Transport Protocol (HTTP) message, etc. After receiving the request, the streaming media cache determines whether it has a previously stored copy of the requested data stream. If so, it returns a copy of the requested data stream to the client.

In particular, the streaming media cache 200 may retrieve the client-requested data stream from its "permanent," e.g., non-volatile, storage media and/or from its "in-core"

memory, such as random access memory (RAM). For instance, in a video-on-demand (VOD) configuration, the streaming media cache may retrieve a client-requested video data stream from one or more of its storage disks. Alternatively, a client-requested "live" video data stream, e.g., received from the origin server 110, may be retrieved from the streaming media cache's in-core memory.

If the client-requested data stream is not resident in the streaming media cache, the cache 200 may, in turn, send a request to the origin server to retrieve it. Here, the origin server 110 is a computer that provides the streaming media cache with copies of data streams that may be served to the plurality of clients 120. In this arrangement, the streaming media cache serves as an "accelerator" for the origin server. That is, a larger number of clients can concurrently access an origin server's data stream through the streaming media cache than through the origin server itself. As such, the streaming media cache can prevent high volumes of network traffic from "overloading" the origin server's network resources, e.g., its available bandwidth and memory.

Figure 2:
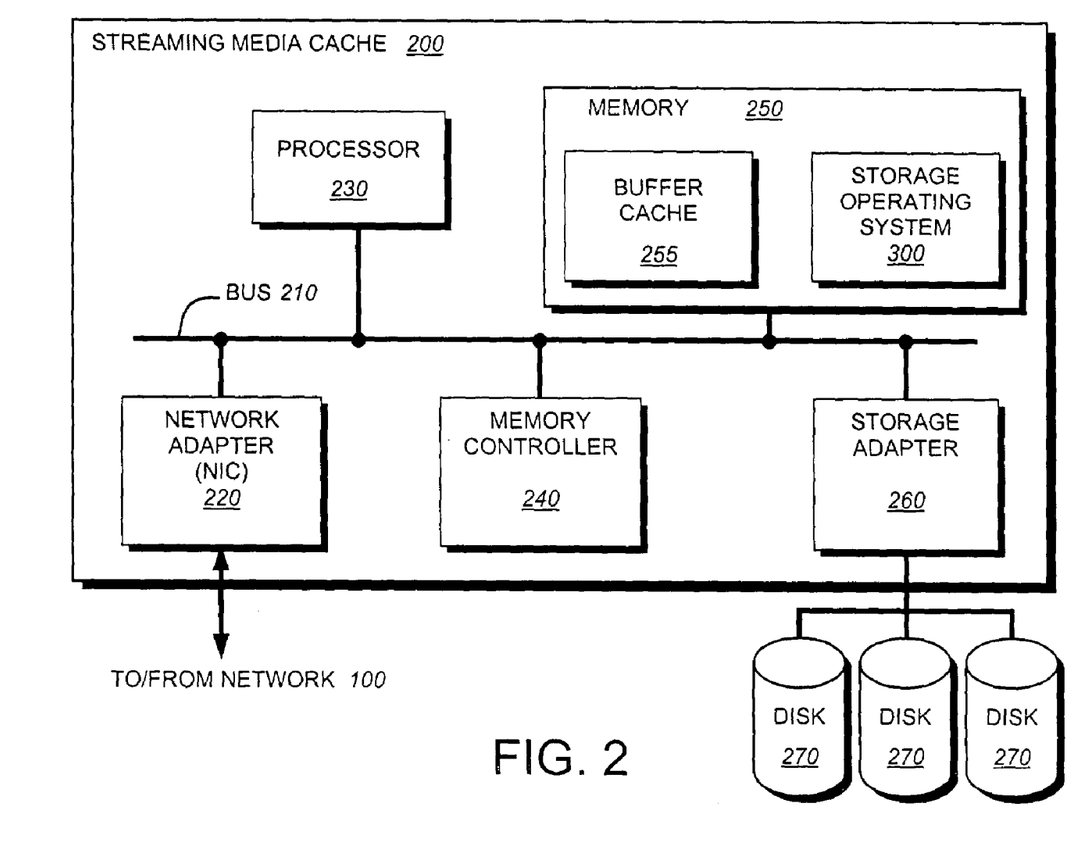
FIG. 2 is a schematic block diagram of an exemplary computer system that may embody the illustrative streaming media cache in FIG. 1.

FIG. 2 is a computer system that may be used to embody the illustrative streaming media cache 200. The streaming media cache may be any type of special-purpose computer (e.g., server) or general-purpose computer, including a standalone computer. The streaming media cache 200 comprises a network adapter 220, a processor 230, a memory controller 240, a memory 250 and a storage adapter 260 interconnected by a system bus 210.

The memory 250 comprises storage locations that are addressable by the processor and adapters for storing software program code. The memory comprises a form of random access memory (RAM) that is generally cleared by a power cycle or other reboot operation (e.g., it is a "volatile" memory). Those skilled in the art will appreciate that other memory means, such as FLASH memory media, may also be used for storing the program instructions and data structures shown in the memory 250. The streaming media cache's processor 230 and adapters 220 and 260 can address data and instructions stored in the memory through the memory controller 240. More specifically, the controller enables addressed portions of the memory's contents to be communicated over the bus 210.

Portions of a storage operating system 300 are typically resident in the memory 250. The term "storage operating system" as used herein generally refers to computer-executable code operable on a computer system that implements file system semantics and manages data access. In this sense, the Data ONTAP™ software by Network Appliance, Inc. is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, a portion of the memory 250 may be organized as a "buffer cache" 255 for storing memory buffer ("mbuf") data structures that are passed between layers of the storage operating system 300 during normal runtime operation. The streaming media cache's processor and adapters may, in turn, comprise processing elements and/or logic circuitry configured to manipulate these data structures. A description of conventional mbuf data structures that may be stored in the buffer cache is provided in *TCP/IP Illustrated, Volume* 2 by Wright et al (1995), which is incorporated herein by reference. According to an illustrative embodiment, mbufs stored in the buffer cache 255 may contain one or more data streams that may be requested by the plurality of clients 120.

The network adapter 220 sends and receives data to/from other nodes in the network 100, e.g., over an Ethernet link, a synchronous optical network (SONET) link, a wireless connection, etc. Specifically, the network adapter comprises the mechanical, electrical and signaling circuitry needed to connect the streaming media cache 200 to a client 120 over the computer network 100. The adapter may also include specialized processing elements, such as logic or processors, that format in-coming and out-going packets consistent with a predetermined network communication protocol. The network adapter may be implemented by components and circuitry on a network interface card (NIC), as known in the art.

The storage adapter 260 cooperates with the operating system 300 to access client-requested data streams stored on the disks 270. The storage disks (or other storage devices) are attached, via the storage adapter 260, to the streaming media cache 200. The storage adapter includes input/output (I/O) interface circuitry that couples to the disks over an I/O interconnect arrangement, such as a conventional high-performance, Fibre Channel serial link topology. The client-requested data streams are retrieved by the storage adapter and processed by the processor 230 (or the adapter 260 itself) in accordance with the storage operating system 300. The data streams are then forwarded over the system bus 210 to the network adapter 220, where they are formatted into packets and sent to their requesting clients 120.

Figure 3:
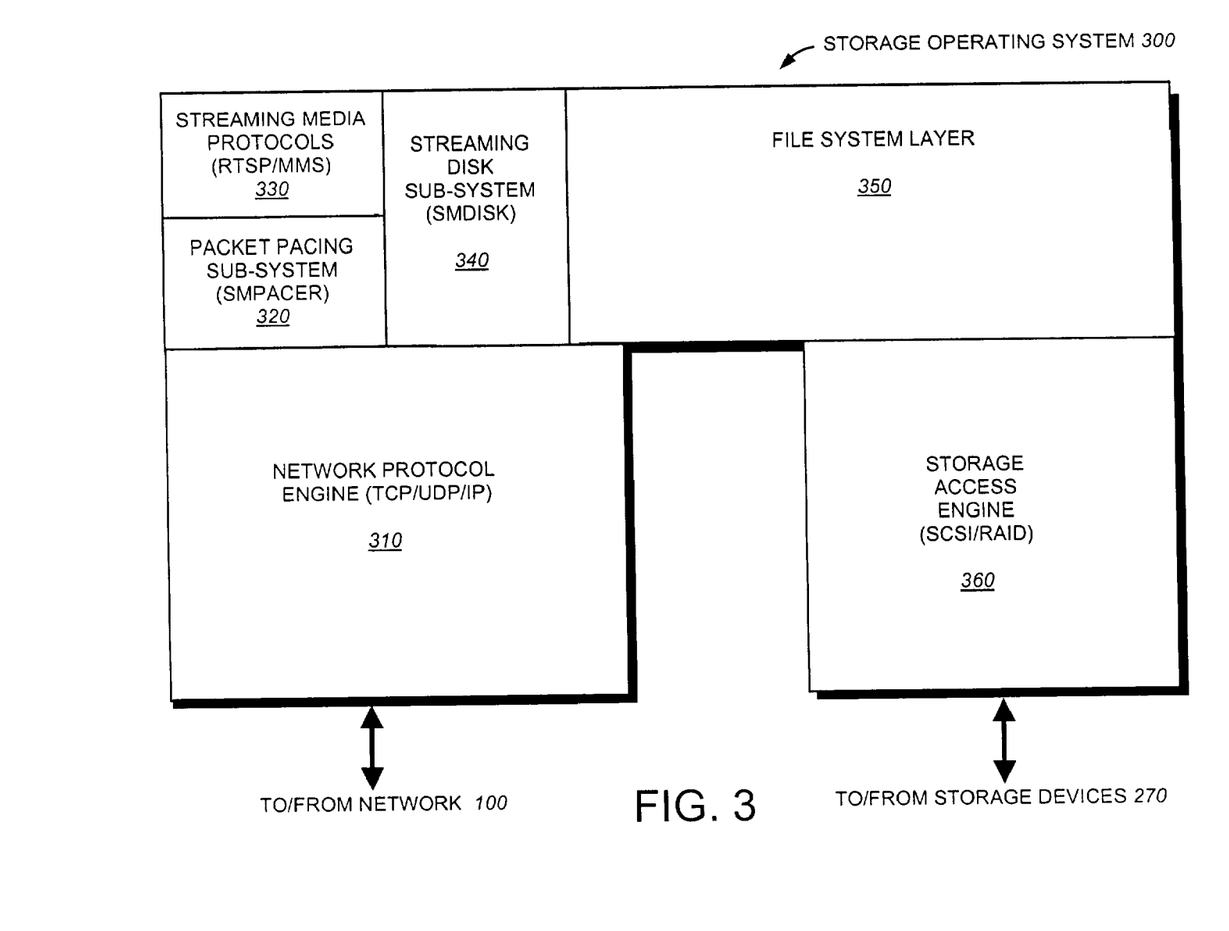
FIG. 3 is a schematic block diagram of an exemplary storage operating system for use with the illustrative streaming media cache in FIG. 1.

FIG. 3 is a schematic block diagram illustrating the exemplary storage operating system 300. The operating system communicates with the network 100 through a series of software layers which are organized as a network protocol engine 310. The layers of the network protocol engine process network headers appended to data packets transmitted and received to/from the network. For example, the engine 310 may comprise a data link layer, an IP layer, a TCP/UDP layer, and so forth.

According to the illustrative embodiment, the network protocol engine associates a unique "port" number with each streaming media protocol, such as the Real Time Streaming Protocol (RTSP) or the Microsoft Media Server (MMS) protocol, that may be processed by the streaming media cache 200. The engine 310 identifies a received data packet as being formatted according to a particular streaming media protocol when a port number stored in a designated header of the received packet equals the port number associated with the protocol. For example, suppose the RTSP and MMS protocols are respectively associated with TCP port numbers 554 and 1755. In this case, the network protocol engine identifies data packets addressed to TCP port number 554 as RTSP data packets, whereas packets addressed to TCP port number 1755 are identified as MMS data packets. Those skilled in the art will appreciate that the port number identifying the streaming media protocol need not be associated with a TCP port and may be, e.g., a UDP port number instead.

When the network protocol engine identifies that a received data packet is addressed to a port number associated with a streaming media protocol, the packet is passed from the engine 310 to the protocol's corresponding streaming media protocol engine 320. For example, a packet addressed to TCP port 554 may be passed from the network protocol engine to an RTSP protocol engine. Each streaming media protocol engine 320 is configured to process data packets formatted in accordance with its corresponding streaming media protocol. For instance, the RTSP protocol engine processes data packets containing RTSP requests to PLAY, PAUSE, RECORD, etc. a particular data stream.

The streaming media protocol engines 320 are interfaced with a packet pacing sub-system (SMPACER) 330 and a streaming media disk sub-system (SMDISK) 340. The SMDISK sub-system receives instructions from the streaming media protocol engines to write and retrieve data packets to/from the storage devices 270. To that end, SMDISK 340 issues functional calls to a file system layer 350, which writes or retrieves data to/from the storage devices through a storage access engine 360. The storage access engine comprises a series of software layers that facilitate data transfers between the file system and the storage devices. For instance, these layers may include, e.g., a disk storage layer to manage a redundant array of independent disks (RAID), a disk driver layer to manage communications over a small computer system interface (SCSI), and so forth.

The SMDISK sub-system is preferably configured to process data packets that are stored in one or more memory buffers (mbufs), e.g., located in the buffer cache 255. Accordingly, the SMDISK sub-system 340 may pass mbuf pointers referencing the data packets to other layers in the storage operating system 300. For example, the SMDISK sub-system may forward mbuf pointers referencing data packets retrieved from the storage devices 270 to the SMPACER sub-system. Similarly, the SMDISK sub-system may receive mbuf pointers corresponding to data packets received by the network protocol engine 310. The technique by which the SMDISK sub-system stores and organizes data packets in the buffer cache is described in more detail in commonly assigned application Ser. No. 09/981,328, entitled Methods and Apparatus for Reducing Streaming Media Data Traffic Bursts, by Jason Lango et al., which is expressly incorporated by reference in its entirety as though fully set forth herein.

The SMPACER sub-system 330 determines the rate at which data packets are sent from the streaming media cache 200 to their requesting clients 120. Typically, a client-requested data stream is located in one or more mbufs stored in the buffer cache 255. As noted, the requested data stream's packets may have been retrieved by SMDISK 340 and stored in the buffer cache. Alternatively, the packets may have been received, e.g., from the origin server 110, and directly stored in the cache 255. In either case, the SMPACER sub-system passes mbuf pointers referencing packets of a client-requested data stream to the network protocol engine 310 at predetermined "send times," e.g., calculated by a streaming protocol engine 320. Upon receiving an mbuf pointer from the SMPACER sub-system, the network protocol engine replicates the data packet referenced by the pointer, appends appropriate network headers to the replicated packet, and sends the replicated packet to its requesting client 120. In the above-described manner, the SMPACER sub-system thus regulates the order and the rate at which data packets are returned to the client.

B. "Pacing" Client-Requested Data Packets Over a Network

As noted, the streaming media cache 200 often receives streaming media data packets from an external "data stream provider," such as the origin server 110, coupled to the streaming media cache. The received packets are typically stored in one or more mbufs located in buffer cache 255. The SMDISK sub-system 340 also may transfer data packets to the buffer cache from the storage devices 270. Advantageously, one or more clients 120 forward requests for data packets stored in the buffer cache, and, in response, the streaming media cache 200 returns copies of the requested data packets to the clients. In this manner, the streaming media cache serves as an "accelerator" that concurrently provides copies of one or more data streams (or portions thereof) to a plurality of clients. In this context, these data streams are illustratively embodied as ordered sequences of data packets.

The rate at which the streaming media cache delivers data packets to the requesting clients is determined by the SMPACER sub-system 330 and an appropriate streaming media protocol engine 320. More specifically, for each client-requested data packet, the SMPACER sub-system makes a "call-back" (i.e., a function call) to a protocol engine 320, which returns a "send time" that defines when a copy of the data packet should be transmitted to its requesting client. The choice of which streaming media protocol engine 320 is called by the SMPACER sub-system depends on which streaming media protocol, e.g., RTSP or MMS protocol, is used by the requesting client. For instance, SMPACER 330 makes a call-back to an MMS protocol engine when the requesting client is configured to communicate via the MMS protocol.

According to an illustrative embodiment, the send times returned by the streaming media protocol engine 320 may be modified versions of conventional send times calculated in accordance with the requesting client's streaming media protocol. More specifically, the protocol engine 320 assigns a random time offset, e.g., between 0 and 500 milliseconds (ms), to each client with which it communicates. Thereafter, the engine adds a client's assigned random time offset to all the conventional send times calculated for data packets requested by that client. For example, suppose a client is assigned a random time offset equal to 33 ms. In this case, a client-requested data packet having a conventional send time equal to 15 ms is instead delayed until 48 ms (15 ms+33 ms).

The random time offset may be generated using conventional random number generators. For example, if the storage operating system 300 is configured to implement a UNIX™-based operating system, such as a Berkeley Software Distribution (BSD) platform, then the standard RAND( ) command may be employed to generate the random time offset. It should be noted that the above-described use of random time offsets is further described in commonly assigned application Ser. No. 09/981,328, entitled Methods and Apparatus for Reducing Streaming Media Data Traffic Bursts, by Jason Lango et al., which has been incorporated herein by reference.

Upon receiving a data packet's send time from the protocol engine 320, the SMPACER sub-system may "round" the send time so it aligns with a predetermined clocking interval. That is, one or more timers may be employed by the SMPACER 330 so it transmits data packets at regularly spaced time intervals. For instance, the server may be configured to only transmit data packets at, e.g., 10 ms intervals. In such a scenario, a packet scheduled to be transmitted by the server in 48 ms is actually sent after 50 ms or 40 ms, depending on how the server is configured to round the scheduled send time so it aligns with its 10 ms intervals. As used herein, "rounding" the send time is broadly understood to include truncations and/or other mathematical operations or rules that enable the SMPACER sub-system to properly align send times with a clocking interval.

Figure 4:
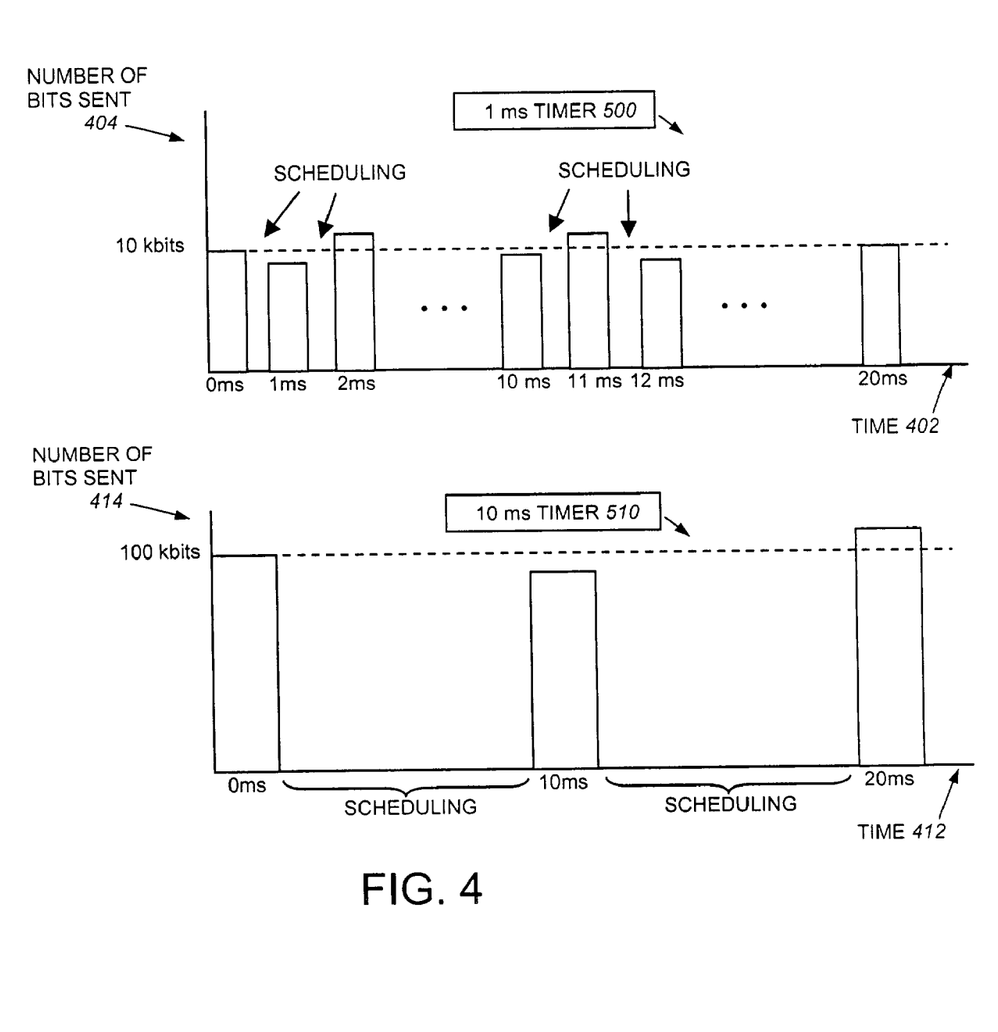
FIG. 4 illustrates the effect of choosing 1 millisecond and 10 millisecond timing intervals on the amount of time available for FIG. 1's illustrative streaming media cache to schedule data packet "send times;"

FIG. 4 illustrates the effect of choosing a timing interval based on the amount of time available for the protocol engine 320 to generate data packet send times. For purposes of explanation, suppose the streaming media cache 200 can output data at a bit rate ("bandwidth") approximately equal to 1 Gbps. Thus, data transmitted from the streaming media cache at 1 Gbps may be "paced" according to different timing intervals. For example, 1 megabits (Mbits) may be transmitted every 1 millisecond (1 Mbits/1 ms=1 Gbps). Alternatively, 10 Mbits may be transmitted every 10 milliseconds (10 Mbits/10 ms=1 Gbps).

The exemplary graph 400 illustrates data transmitted from the streaming media cache at 1 millisecond timing intervals. The vertical axis 404 represents the number of bits (in Mbits) transmitted by the streaming media cache, and the horizontal axis 402 represents elapsed time (in milliseconds). The streaming media cache outputs data packets totaling approximately 1 Mbits of data every 1 ms. Consequently, the streaming media protocol engine 320 and the SMPACER sub-system 330 may "schedule" send times for future client-requested data packets in-between these 1 millisecond time intervals.

When the streaming media cache 200 supplies data to a large number of clients, the protocol engine 320 and SMPACER 330 may not be able to schedule send times for all the client-requested data packets within a 1 millisecond time interval. For example, more client-requested data packets need to be scheduled when the streaming media cache's 1 Gbps bandwidth is shared among 10,000 clients connected to the streaming media cache over 100 kbps connections (10,000×100 kbps=1 Gbps) than when the bandwidth is divided among 100 clients communicating over 10 Mbps connections (100×10 Mbps=1 Gbps). Accordingly, a longer duration timing interval may be needed to schedule send times for the larger number of data packets that are transmitted to the lower bandwidth clients.

The exemplary graph 410 illustrates the number of bits that may be transmitted using a longer, 10 millisecond timing interval. The vertical axis 414 represents the number of bits (in Mbits) transmitted by the streaming media cache, and the horizontal axis 412 represents elapsed time (in milliseconds). As compared with the 1 millisecond timing interval in graph 400, the graph 410 indicates a larger number of data bits (approximately 10 Mbits) are transmitted at longer, 10 ms intervals. In this case, the protocol engine 320 and SMPACER 330 have more time to schedule send times for data packets inbetween the 10 ms intervals. Thus, the longer duration timing interval may be better suited for scheduling large numbers of data packet send times associated with relatively low-bandwidth clients.

According to the present invention, the SMPACER sub-system 330 is configured to select a timing interval, chosen from a set of one or more predetermined timing intervals, on a client-by-client basis. Illustratively, the SMPACER 330 may select a first timing interval for clients requesting data streams below a predetermined bit rate ("bandwidth") and may assign a second, shorter duration, timing interval for clients requesting data streams above the predetermined bit rate.

For instance, suppose the predetermined bit rate is equal to 300 kbps and the SMPACER sub-system is configured to send data packets over the network every 10 milliseconds (ms), or alternatively, every 1 millisecond. Accordingly, if a client requests a data stream at a bit rate equal to 150 kbps, then the SMPACER chooses the 10 ms timing interval. On the other hand, if a client requested a data stream at a bit rate equal to 400 kbps, then the SMPACER chooses the 1 ms timing interval. Here, it should be noted that if the client requests a stream exactly equal to the predetermined bit rate (e.g., 300 kbps), then the SMPACER may be configured to choose either interval without loss of generality.

Figure 5:
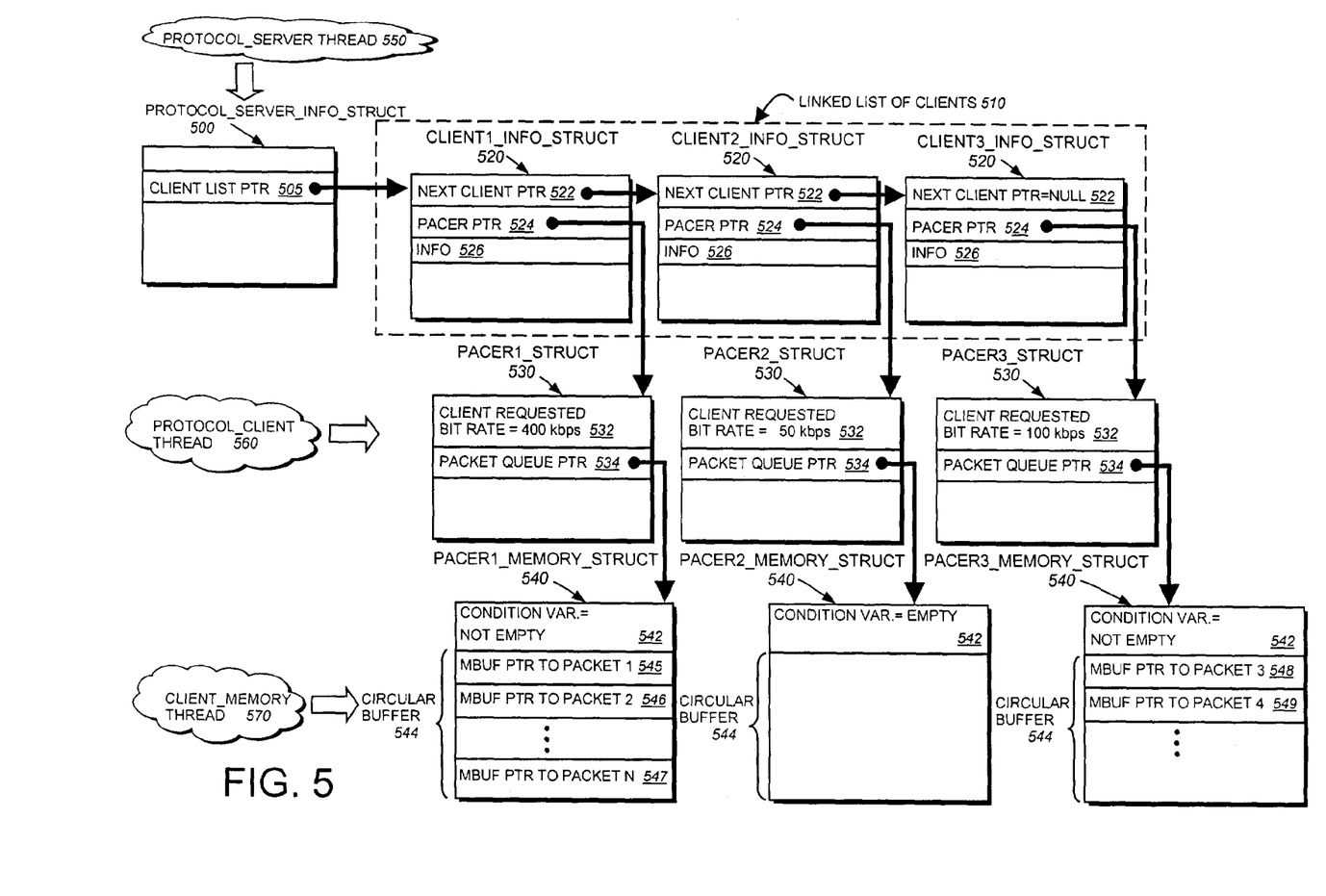
FIG. 5 is a schematic block diagram of an exemplary streaming media protocol engine and SMPACER sub-system that may be implemented by the illustrative streaming media cache in FIG. 1.

FIG. 5 illustrates an exemplary "in-core" memory implementation that may be used by the streaming media protocol engine 320 and the SMPACER sub-system 330 to transmit data packets to requesting clients 120 at predetermined "send times." In this illustrative embodiment, the streaming media protocol engine 320 includes, inter alia, a protocol-server thread 550 and protocol-client thread 560, and the SMPACER sub-system includes, inter cilia, a client-memory thread 570. As used herein, each of the "threads" is embodied as software code that may be executed by a processing element, such as the processor 230. Those skilled in the art will appreciate that the streaming media cache 200 may concurrently execute the threads 550, 560 and 570 in a multi-threaded configuration.

The above-mentioned threads work together to manage access to data streams stored in the streaming media cache 200. The protocol-server thread 550 manages communications between the streaming media cache and a data stream provider, such as the origin server 110. The protocol-client thread 560 manages communications between the streaming media cache and clients requesting access to data streams stored in the streaming media cache. The client-memory thread 570 manages when data packets in a data stream may be forwarded to their requesting client(s). Each of these threads will be further described in relation to the data structures they use to perform their assigned functions.

The protocol-server thread 550 is configured to manage communications with a data stream provider, such as the origin server 110. Specifically, the thread 550 can negotiate communication parameters, such as bit rate, packet size, etc. defining how data packets are transferred from the data stream provider to the streaming media cache 200. Illustratively, the protocol-server thread creates a PROTOCOL_SERVER_INFO_STRUCT 500 for each data stream it receives from the provider. Each data structure 500 stores meta-data relating to its associated data stream. Such meta-data may include the communication parameters to receive the data stream, the title of the data stream, the length of the data stream, and so forth. While only one PROTOCOL_SERVER_INFO_STRUCT is shown, the protocol-server thread may create a plurality of such data structures corresponding to a plurality of data streams received from one or more data stream providers.

Each PROTOCOL_SERVER_INFO_STRUCT 500 includes a CLIENT_LIST_PTR field 505 that stores a pointer value that references a location of a linked list 510 of CLIENT_INFO_STRUCTs 520 in memory. As described herein, a CLIENT_INFO_STRUCT is added to the linked list 510 for each client that requests access to the data stream associated with the PROTOCOL_SERVER_INFO_STRUCT. Of note, while the exemplary list 510 indicates that three clients access the data stream associated with the PROTOCOL_SERVER_INFO_STRUCT 500, those skilled in the art will understand that the number of clients accessing the data stream may vary, and in some cases may even equal zero.

The protocol-client thread 560 receives and processes client requests for data streams stored in the streaming media cache 200. Such requests are formatted according to the streaming media protocol, such as the RTSP or MMS protocol, associated with the thread 560's streaming media protocol engine 320. For example, assume the protocol-client thread 560 is executed by an RTSP protocol engine 320. In this case, the thread 560 processes RTSP formatted client requests received by the streaming media cache 200, e.g., requesting that the streaming media cache PLAY, PAUSE, etc. a desired data stream.

Every time a new client requests access to a data stream, the protocol-client thread 560 initiates the creation of a new CLIENT_INFO_STRUCT 520 which may be added to the linked list 510. The new data structure 520 may be generated by the protocol-client thread 560 or any other software coded for that purpose. In the case where a PROTOCOL_SERVER_INFO_STRUCT corresponding to the requested data stream was not previously generated, then the thread 560 may additionally initiate the creation, e.g., by the protocol-server thread 550, of a new PROTOCOL_SERVER_INFO_STRUCT 500 corresponding to the client-requested data stream.

Each CLIENT_INFO_STRUCT 520 stores meta-data relating to a client that can access the PROTOCOL_SERVER_INFO_STRUCT's associated data stream. For instance, a data structure 520 may contain one or more INFO fields 526 that store information identifying its associated client, the state of its client's last received request (PLAY, PAUSE, etc.), and so on. In addition, each of the data structures 520 contains a NEXT_CLIENT_PTR field 522 storing a value that references the memory location of the next CLIENT_INFO_STRUCT in the linked list 510. Accordingly, the last CLIENT_INFO_STRUCT in the list stores a NULL value, or other value, in its field 522 to indicate the end of the list.

Upon receiving a client's request for a data stream, the protocol-client thread 560 also initiates the creation of a PACER_STRUCT 530 and a PACER_MEMORY_STRUCT 540 for the client (if they were not already created). The data structures 530 and 540 may be generated by the protocol-client thread 560 or any other software coded for that purpose. As shown, each CLIENT_INFO_STRUCT 520 contains a PACER_PTR field 524 storing a pointer value that references the client's corresponding PACER_STRUCT 530. And each PACER_STRUCT 530 contains a PACKET_QUEUE_PTR field 534 storing a pointer value that references the client's corresponding PACER_MEMORY_STRUCT 540.

Each PACER_STRUCT 530 stores information relating to the "pacing" (i.e., rate) of data transmitted to its associated client. For instance, the PACER_STRUCT may contain a field 532 that stores the client's requested bit rate. Other pacing-related information (not shown), such as handshake information, may also be stored in the PACER_STRUCT 530. Information stored in a PACER_STRUCT may be updated in response to client requests received by the protocol-client thread 560. For example, the protocol-client thread may receive a client request to "PLAY" a data stream at a first bit rate. Accordingly, the thread 560 records this first client-requested bit rate in a field 532 in the client's associated PACER_STRUCT. Later, the same client may request its bit rate to increase or decrease to a second bit rate. Thus, the thread 560 may modify the contents of the field 532 to indicate the second client-requested bit rate.

Each PACER_MEMORY_STRUCT 540 contains a circular buffer 544 (i.e., a finite-length queue) that stores an ordered sequence of data packets that may be sent to its associated client. More specifically, the buffer 544 stores an ordered sequence of mbuf pointers that reference the locations of data packets stored in the buffer cache 255. Therefore, in accordance with the illustrative embodiment, every time the protocol-server thread 550 receives a new data packet, the thread 550 enqueues a copy of an mbuf pointer referencing the received packet into each PACER_MEMORY_STRUCT associated with clients that may access the received data packet.

For example, assume the protocol-server thread 550 receives a data packet contained in the data stream associated with the exemplary PROTOCOL_SERVER_INFO_STRUCT 500. The thread 550 may sequentially "walk" (i.e., traverse) the linked list 510, e.g., using the pointers stored in the fields 522, to identify PACER_MEMORY_STRUCTs associated with clients configured to access the received packet. Operationally, the thread 550 may locate the PACER_MEMORY_STRUCTs, e.g., using the pointers stored in fields 524 and 534. For each located PACER_MEMORY_STRUCT 540, the thread 550 enqueues a copy of an mbuf pointer referencing the received data packet into an appropriate location in the PACER_MEMORY_STRUCT's circular buffer 544.

In addition, when the protocol-server thread 550 enqueues an mbuf pointer in a circular buffer 544, the thread also updates the contents of a CONDITION_VAR field 542 in the circular buffer's PACER_MEMORY_STRUCT 540. The field 542 stores a value, such as a Boolean value, indicating whether the PACER_MEMORY_STRUCT's circular buffer is empty. Therefore, after enqueueing an mbuf pointer in a circular buffer 544, the thread 550 may store a value in the field 542, when necessary, to indicate that the circular buffer is not empty.

By way of example, three exemplary PACER_MEMORY_STRUCTs 540 are shown in FIG. 5. Each illustrated PACER_MEMORY_STRUCT corresponds to a client having a CLIENT_INFO_STRUCT in the exemplary linked list 510. The first client's PACER1_MEMORY_STRUCT contains a "full" circular memory buffer 544 storing copies of mbuf pointers, such as those stored in fields 545, 546 and 547, referencing the data packets numbered 1 to N. Thus, the CONDITION_VAR field 542 for the first client indicates its circular buffer is not empty. In contrast, the field 542 in the second client's PACER2_MEMORY_STRUCT indicates that its circular buffer is empty, i.e., containing no mbuf pointers.

The third client's PACER3_MEMORY_STRUCT contains a field 542 indicating that its circular buffer is not empty. However, as shown in fields 548 and 549, the mbuf pointers stored in the third client's circular buffer may be offset from those stored in other clients' circular buffers. For example, the first client's circular buffer 544 stores mbuf pointers referencing data packets numbered from 1 to N, whereas the third client's circular buffer stores a different set of mbuf pointers, e.g., referencing an ordered sequence of data packets beginning with data packet number 3.

The client-memory thread 570 determines when copies of client-requested data packets are returned to their requesting clients. According to the illustrative embodiment, when the protocol-client thread 560 receives a "PLAY" request from a client 120, the protocol-client thread 560 instructs the client-memory thread 570 to begin execution of a "while-forever" loop. The while-forever loop is a software routine which is repeatedly executed by the client-memory thread 570 until the protocol-client thread 560 instructs the loop to stop, e.g., in response to a receiving a new client request.

The while-forever loop first determines whether there are any mbuf pointers queued in the circular buffer 544 associated with the requesting client. Preferably, this determination is based on a value stored in a CONDITION_VAR field 542 indicating whether or not the circular buffer is empty. If the circular buffer is determined to be empty, then the while-forever loop waits until a predetermined timeout period T has elapsed before the loop repeats itself. The loop's next iteration makes a new determination to test whether one or more mbuf pointers were enqueued, e.g., by protocol-server thread 550, in the client's circular buffer during the timeout period.

However, when the while-forever loop determines the client's circular buffer is not empty and thus contains at least one mbuf pointer, the loop locates the mbuf pointer located at the "head" of the circular buffer's queue. The mbuf pointer at the queue's head corresponds to the next data packet that will be transmitted to the requesting client 120. The while-forever loop passes a copy of this mbuf pointer as an argument in a "call-back" (i.e., a function call) to a streaming media protocol engine 320 associated with the requesting client. In response, the engine 320 generates a send time for the mbuf pointer's corresponding data packet.

As previously noted, the protocol engine 320 may derive the send time by generating a conventional send time according to the client's streaming media protocol, such as RTSP or MMS protocol, and adding to the conventional send time a random time offset assigned to the client. The send time derived by the engine 320 is then returned to the while-forever loop, which "rounds" the send time to align it with a timing interval chosen from a set of one or more predetermined timing intervals. According to the present invention, the "while-forever" loop selects the timing interval based on the client's requested bit rate, e.g., stored in the client's associated PACER_STRUCT 530. Illustratively, the loop selects a first timing interval if the client's requested bit rate is below a predetermined bit rate, else the loop selects a second, shorter duration, timing interval if the client's requested bit rate is above (e.g., or equal to) the predetermined bit rate.

The while-forever loop "sleeps" (waits) until the rounded send time has elapsed. After waiting the allotted time, the loop dequeues the mbuf pointer at the head of the queue and forwards the dequeued mbuf pointer to the network protocol engine 310. The while-forever loop then repeats itself and makes a new determination whether or not the client's circular buffer is empty.

Figure 6A:
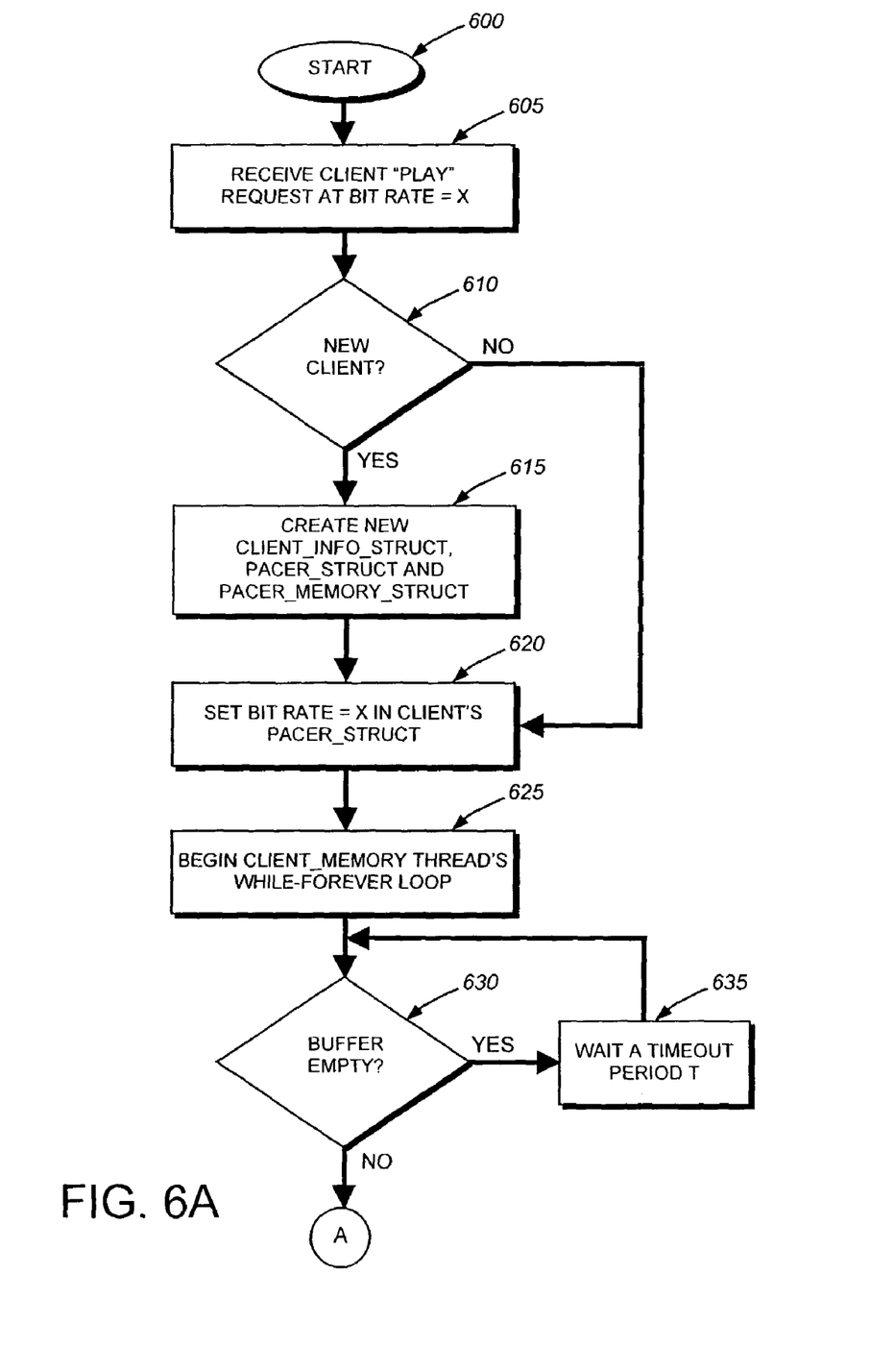
FIGS. 6A and 6B are flowcharts illustrating a sequence of steps that may be executed by the exemplary protocol engine in FIG. 4.
Figure 6B:
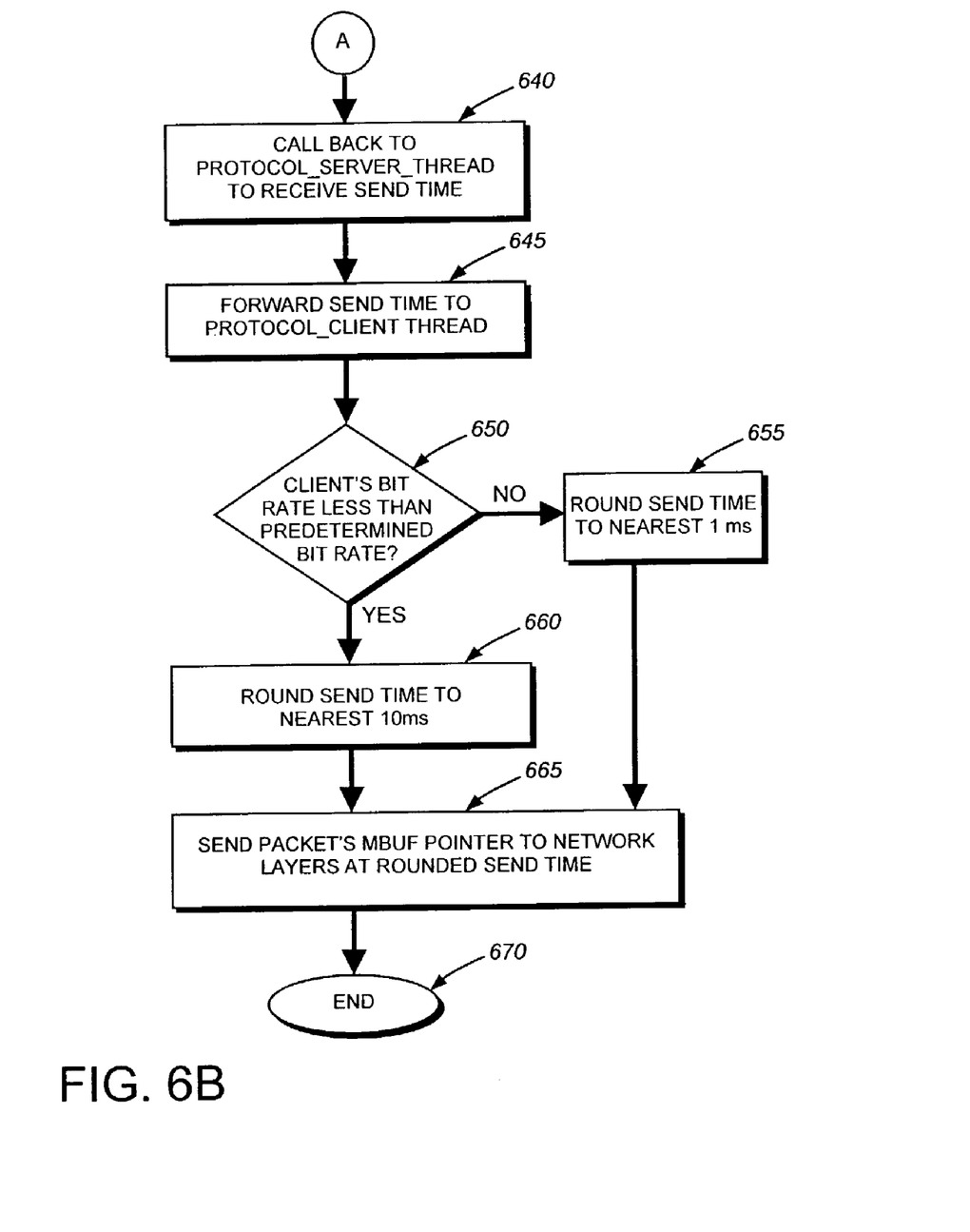

FIGS. 6A and 6B are flowcharts illustrating a sequence of steps that may be executed by an exemplary protocol engine 320 and SMPACER sub-system 330 for transmitting a data packet to a client 120. The sequence begins at step 600 and proceeds to step 605 where client's request to play a data stream at a bit rate X is received by the streaming media cache 200 and forwarded to a protocol-client thread 560. At step 610, the thread 560 determines whether the request was received from a new client. If so, then at step 615, a new CLIENT_INFO_STRUCT 520 is added to a list 510 associated with the client's requested data stream. In addition, a PACER_STRUCT 530 and PACER_MEMORY_STRUCT 540 are also created for the new client.

At step 620, the protocol-client thread 560 sets the client's requested bit rate (X) in an appropriate field, such as field 532, in the client's PACER_STRUCT. Notably, if the client later requests to change its bit rate, the protocol-client thread can modify the bit rate stored in the PACER_STRUCT. Furthermore, those in the art will appreciate that the thread 560 may also choose to ignore the client's requested bit rate, e.g., if it is unreasonable or impossible to achieve. In such cases, the protocol-client thread may instead choose a different bit rate for the client than that requested.

Next, at step 625, the client's associated client-memory thread 570 begins execution of a "while-forever" loop, one iteration of which is described in detail by steps 630-670. First, at step 630, the loop determines whether the circular buffer 544 in the client's associated PACER_MEMORY_STRUCT is empty. This determination may be based on the value of a CONDITION_VAR field 542. If the circular buffer is empty, and thus contains no mbuf pointers referencing data packets to send to the client, then the while-forever loop waits a timeout period T, at step 635. After the timeout period elapses, the sequence returns to step 630.

On the other hand, if the client's circular buffer contains at least one mbuf pointer, then at step 640, the while-forever loop makes a call-back to a streaming media protocol engine 320 associated with the requesting client in order to retrieve a send time for the data packet whose mbuf pointer is enqueued at the "head" of the circular buffer. The protocol engine 320 returns a send time, which is then forwarded to the client-memory thread, at step 645. As noted, the send time may be derived by the protocol engine 320 based on a random time offset assigned to the requesting client.

At step 650, the client's requested bit rate, e.g., stored in its associate PACER_STRUCT, is compared with a predetermined bit rate. If the client's bit rate is greater than the predetermined bit rate, then at step 655, the send time is rounded to a first timing interval, e.g., the nearest 1 millisecond. Otherwise, the send time is rounded to a longer duration, second timing interval, e.g., the nearest 10 milliseconds, at step 660. The client-memory thread 570 waits until the rounded send time has elapsed, and then at step 665, the mbuf pointer at the head of the circular buffer is dequeued and forwarded to the network protocol engine 310. The network protocol engine makes a copy of the data packet referred to by the forwarded mbuf pointer, appends appropriate network headers, and transmits the copied data packet to the client 120. The sequence ends at step 670.

C. Conclusion

The foregoing has been a detailed description of an illustrative embodiment of the invention. Various modifications and additions can be made without departing from the spirit and scope of the invention. For example, random time offsets assigned to requesting clients are used to derive "send times" in the illustrative embodiment. However, it is expressly contemplated that the invention's teachings and principles relating to choosing a predetermined timing interval based on a client's requested bit rate apply even when the client's derived send times do not incorporate random time offsets. In addition, the RTSP and MMS protocols are described herein as exemplary streaming media protocols, although the present invention equally applies to other streaming media protocols. Also, a streaming protocol engine 320 may be configured to check whether a client has security privileges, e.g., according to an access control list (ACL), before the client is permitted to access its requested data stream.

While the illustrative streaming media cache 200 may be a general-purpose computer, it may also be a specialized computer, such as a gaming console, that supplies data streams to one or more clients coupled over a network. Further, it is expressly contemplated that the teachings of this invention can be implemented as software, including a computer-readable medium having program instructions executing on a computer, hardware, firmware, or a combination thereof. Moreover, those skilled in the art will also understand that the teachings set forth herein are not limited to any specific operating system (OS) implementation, and instead may be executed by a wide variety of OS platforms. Accordingly this description is meant to be taken only by way of example and not to otherwise limit the scope of the invention.

What is claimed is:
1. A method for operating an intermediate network cache, the method comprising:
   (A) receiving a request from a client computer system to transmit a sequence of a plurality of data packets at a specified bit rate, wherein the specified bit rate is a rate requested by the client computer system for receiving the plurality of data packets, and wherein the request is formatted according to an RTSP or a MMS protocol;
   (B) comparing the specified bit rate requested by the client computer system with a predetermined bit rate associated with the intermediate network cache to determine a selected timing interval, wherein the predetermined bit rate indicates a bandwidth value of the intermediate network cache;
in the event that the specified bit rate is greater than the predetermined bit rate, pacing transmission of the data packets with a first timing interval as the selected timing interval;
in the event that the specified bit rate is less than the predetermined rate, pacing transmission of the data packets with a second timing interval as the selected timing interval;
(C) determining, in response to the pacing transmission of the data packets, a send time that defines when the server transmits to the client system a first data packet in the sequence of one or more data packets, wherein the send time includes a predetermined random time offset that has been assigned to the client system to control pacing of the transmission of the data packets to the client system;
(D) rounding the send time to align with the selected timing interval;
(E) transmitting the first data packet after the rounded send time has elapsed; and
(F) repeating steps (B) through (E) for each data packet in the sequence of one or more data packets, wherein the timing interval in step (B) is selected to optimize the intermediate network cache's allocation of resources when determining the send time in step (C).

2. The method according to claim 1, wherein step (C) further comprises:
selecting a first timing interval from the set of one or more predetermined timing intervals if the client-requested bit rate is greater than a predetermined bit rate, otherwise selecting a second timing interval from the set of one or more predetermined timing intervals.

3. The method according to claim 2, wherein the second timing interval is a longer duration interval than the first timing interval.

4. The method according to claim 1, wherein step (B) further comprises:
waiting a predetermined timeout period if the first data packet is not resident in the intermediate network cache; and
determining whether the first data packet was received by the intermediate network cache during the predetermined timeout period.

5. An intermediate network cache comprising:
a processor and memory;
a network adapter configured to send and receive data packets over a computer network;
a network protocol engine configured to receive requests from the client system and configured to transmit data packets in a sequence of a plurality of data packets to the client system;
a streaming media protocol engine configured to determine, in response to a request received by the network protocol engine, a specified bit rate to transmit a plurality of data packets to the client system, wherein the specified bit rate is a rate requested by the client system for receiving the plurality of data packets, and wherein the request is formatted according to an RTSP or a MMS protocol;
an operating system to compare the specified bit rate requested by the client system with a predetermined bit rate associated with the intermediate network cache to determine a selected timing interval, wherein the predetermined bit rate indicates a bandwidth value of the intermediate network cache;
in the event that the specified bit rate is greater than the predetermined bit rate, pacing transmission of the data packets with a first timing interval as a selected timing interval;
in the event that the specified bit rate is less than the predetermined rate, pacing transmission of the data packets with a second timing interval as the selected timing interval; and
a packet pacing sub-system configured (i) to receive a send time from the streaming media protocol engine, wherein the send time includes a predetermined random time offset that has been assigned to the client system to control pacing of the transmission of the data packets to the client system, (ii) to round the received send time to align with the selected timing interval, and (iii) to forward a data packet in the sequence of a plurality of data packets to the network protocol engine at the rounded send time.

6. The intermediate network cache according to claim 5, wherein at least one request received by the network protocol engine indicates a client-requested bit rate that is used by the packet pacing sub-system to select the timing interval from a set of one or more predetermined timing intervals.

7. The intermediate network cache according to claim 6, wherein the packet pacing sub-system selects a first timing interval from a set of one or more predetermined timing intervals if the client-requested bit rate is greater than a predetermined bit rate, otherwise the packet pacing sub-system selects a second timing interval from the set of one or more predetermined timing intervals.

8. The intermediate network cache according to claim 7, wherein the second timing interval is a longer duration interval than the first timing interval.

9. The intermediate network cache according to claim 5, wherein the streaming media protocol engine includes a protocol-client thread for communicating with the client system, and the packet pacing sub-system includes a client-memory thread for managing when data packets in the sequence of a plurality of data packets are forwarded to the network protocol engine.

10. The intermediate network cache according to claim 9, wherein the client-memory thread receives send times from the streaming media protocol engine, rounds the received send times to align with the timing interval, and forwards data packets in the sequence of one or more data packets to the network protocol engine based on the rounded send times.

11. An intermediate network cache comprising:
a processor;
a network adapter configured to send and receive data packets over a computer network;
a memory including a buffer cache that stores a sequence of one or more data packets, at least a portion of the memory being configured to store a sequence of instructions executable by the processor for:
(A) receiving a request from a client computer system to transmit a sequence of a plurality of data packets at a specified bit rate, wherein the specified bit rate is a rate requested by the client computer system for receiving the plurality of data packets, and wherein the request is formatted according to an RTSP or a MMS protocol;
(B) comparing the specified bit rate requested by the client computer system with a predetermined bit rate associated with the intermediate network cache to determine a selected timing interval, wherein the predetermined bit rate indicates a bandwidth value of the intermediate network cache, and in the event that the specified bit rate is greater than the predetermined bit rate, pacing transmission of the data packets with a first timing interval as the selected timing interval;

in the event that the specified bit rate is less than the predetermined rate, pacing transmission of the data packets with a second timing interval as the selected timing interval;

(C) determining, in response to the pacing transmission of the data packets, a send time that defines when the computer system transmits to the client system a first data packet in the sequence of one or more data packets, wherein the send time includes a predetermined random time offset that has been assigned to the client system to control pacing of the transmission of the data packets to the client system;

(D) rounding the send time to align with the selected timing interval;

(E) transmitting the first data packet after the rounded send time has elapsed; and (F) repeating steps (B) through (E) for each data packet in the sequence of one or more data packets, wherein the timing interval in step (B) is selected to optimize the computer system's allocation of resources when determining the send time in step (C).

12. The intermediate network cache according to claim 11, wherein the network adapter receives at least one of the data packets in the sequence of a plurality of data packets from an origin server in communication with the intermediate network cache over the network.

13. The intermediate network cache according to claim 11, wherein step (C) further comprises:

selecting a first timing interval from a set of one or more predetermined timing intervals if the client-requested bit rate is greater than a predetermined bit rate, otherwise selecting a second timing interval from the set of one or more predetermined timing intervals.

14. The intermediate network cache according to claim 13, wherein the second timing interval is a longer duration interval than the first timing interval.

15. An intermediate network cache comprising:

means for receiving a request from a client computer system to transmit a sequence of a plurality of data packets at a specified bit rate, wherein the specified bit rate is a rate requested by the client computer system for receiving the plurality of data packets, and wherein the request is formatted according to an RTSP or a MMS protocol;

means for comparing the specified bit rate requested by the client computer system with a predetermined bit rate associated with the intermediate network cache to determine a selected timing interval, wherein the predetermined bit rate indicates a bandwidth value of the intermediate network cache;

in the event that the specified bit rate is greater than the predetermined bit rate, pacing transmission of the data packets with a first timing interval as the selected timing interval;

in the event that the specified bit rate is less than the predetermined rate, pacing transmission of the data packets with a second timing interval as the selected timing interval;

means for determining, in response to the selected timing interval, a send time that defines when the apparatus transmits to the client system a data packet in the sequence of one or more data packets, wherein the send time includes a predetermined random time offset that has been assigned to the client system to control pacing of the transmission of the data packets to the client system;

means for rounding the send time to align with the selected timing interval; and means for transmitting the data packet after the rounded send time has elapsed.

16. The intermediate network cache according to claim 15, further comprising:

means for selecting a first timing interval from a set of one or more predetermined timing intervals if the client-requested bit rate is greater than a predetermined bit rate, otherwise selecting a second timing interval from the set of one or more predetermined timing intervals.

17. The intermediate network cache according to claim 16, wherein the second timing interval is a longer duration interval than the first timing interval.

18. A computer-readable non-transitory media comprising instructions for execution in a processor for the practice of a method of operating an intermediate network cache comprising:

(A) receiving a request from a client computer system to transmit a sequence of a plurality of data packets at a specified bit rate, wherein the specified bit rate is a rate requested by the client computer system for receiving the plurality of data packets, and wherein the request is formatted according to an RTSP or a MMS protocol;

(B) comparing the specified bit rate requested by the client computer system with a predetermined bit rate associated with the intermediate network cache to determine a selected timing interval, wherein the predetermined bit rate indicates a bandwidth value of the intermediate network cache, in the event that the specified bit rate is greater than the predetermined bit rate, pacing transmission of the data packets with a first timing interval as the selected timing interval;

in the event that the specified bit rate is less than the predetermined rate, pacing transmission of the data packets with a second timing interval as the selected timing interval;

(C) determining, in response to the selected timing interval, a send time that defines when the server transmits to the client system a first data packet in the sequence of one or more data packets, wherein the send time includes a predetermined random time offset that has been assigned to the client system to control pacing of the transmission of the data packets to the client system;

(D) rounding the send time to align with the selected timing interval;

(E) transmitting the first data packet after the rounded send time has elapsed; and (F) repeating steps (B) through (E) for each data packet in the sequence of one or more data packets, wherein the timing interval in step (B) is selected to optimize the intermediate network cache's allocation of resources when determining the send time in step (C).

19. The computer-readable media according to claim 18, wherein step (C) further comprises:

selecting a first timing interval from a set of one or more predetermined timing intervals if the client-requested bit rate is greater than a predetermined bit rate, otherwise selecting a second timing interval from the set of one or more predetermined timing intervals.

20. The computer-readable media according to claim 19, wherein the second timing interval is a longer duration interval than the first timing interval.

21. An intermediate network cache comprising:
   a memory configured to store a sequence of instructions executable by a processor for:
   (A) receiving a request from a client computer system to transmit a sequence of a plurality of data packets at a specified bit rate, wherein the specified bit rate is a rate requested by the client computer system for receiving the plurality of data packets, and wherein the request is formatted according to an RTSP or a MMS protocol;
   (B) comparing the specified bit rate requested by the client computer system with a predetermined bit rate associated with the intermediate network cache to determine a selected timing interval, wherein the predetermined bit rate indicates a bandwidth value of the intermediate network cache;
   in the event that the specified bit rate is greater than the predetermined bit rate, pacing transmission of the data packets with a first timing interval as the selected timing interval;
   in the event that the specified bit rate is less than the predetermined rate, pacing transmission of the data packets with a second timing interval as the selected timing interval;
   (C) determining, in response to the selected timing interval, a send time that defines when the server transmits to the client system a first data packet in the sequence of one or more data packets, wherein the send time includes a predetermined random time offset that has been assigned to the client system to control pacing of the transmission of the data packets to the client system;
   (D) transmitting the first data packet to the client system in accordance with the send time; and
   (E) repeating steps (B) through (D) for each data packet in the sequence of one or more data packets, wherein the timing interval in step (B) is selected to optimize the intermediate network cache's allocation of resources when determining the send time in step (C).

22. The intermediate network cache according to claim 21, wherein the sequence of instructions further comprises instructions for rounding the send time to align with the selected timing interval.

23. The intermediate network cache according to claim 21, wherein step (C) further comprises:
   selecting a first timing interval from a set of one or more predetermined timing intervals if the client-requested bit rate is greater than a predetermined bit rate, otherwise selecting a second timing interval from the set of one or more predetermined timing intervals.

24. The server according to claim 23, wherein the second timing interval is a longer duration interval than the first timing interval.

25. A method for operating an intermediate network cache, the method comprising:
   receiving a request from a client computer system to transmit a sequence of a plurality of data packets at a specified bit rate, wherein the specified bit rate is a rate requested by the client computer system for receiving the plurality of data packets, and wherein the request is formatted according to an RTSP or a MMS protocol;
   comparing the specified bit rate requested by the client computer system with a predetermined bit rate associated with the intermediate network cache to determine a selected timing interval, wherein the predetermined bit rate indicates a bandwidth value of the intermediate network cache;
   in the event that the specified bit rate is greater than the predetermined bit rate, pacing transmission of the data packets with a first timing interval as the selected timing interval;
   in the event that the specified bit rate is less than the predetermined rate, pacing transmission of the data packets with a second timing interval as the selected timing interval;
   determining, in response to the selected timing interval, a send time, wherein the send time includes a predetermined random time offset that has been assigned to the client computer system to control pacing of the transmission of the data packets to the client system;
   rounding the send time to correspond with the selected timing interval to generate a rounded send time; and
   transmitting a data packet at the rounded send time.

26. A computer-readable non-transitory media comprising instructions for execution in a processor for the practice of a method of operating an intermediate network cache that transmits a sequence of a plurality of data packets to a client system, the method comprising:
   receiving a request from a client computer system to transmit a sequence of a plurality of data packets at a specified bit rate, wherein the specified bit rate is a rate requested by the client computer system for receiving the plurality of data packets, and wherein the request is formatted according to an RTSP or a MMS protocol;
   comparing the specified bit rate requested by the client computer system with a predetermined bit rate associated with the intermediate network cache to determine a selected timing interval, wherein the predetermined bit rate indicates a bandwidth value of the intermediate network cache,
   in the event that the specified bit rate is greater than the predetermined bit rate, pacing transmission of the data packets with a first timing interval as the selected timing interval;
   in the event that the specified bit rate is less than the predetermined rate, pacing transmission of the data packets with a second timing interval as the selected timing interval;
   determining a send time in response to identifying the client, wherein the send time includes a predetermined random time offset that has been assigned to the client system to control pacing of the transmission of the data packets to the client system;
   rounding the send time to correspond with the selected timing interval to generate a rounded send time; and
   transmitting a data packet at the rounded send time.

* * * * *